United States Patent [19]
Ogata

[11] Patent Number: 5,666,233
[45] Date of Patent: Sep. 9, 1997

[54] TWO-UNIT ZOOM LENS SYSTEM HAVING A HIGH ZOOM RATIO

[75] Inventor: Yasuji Ogata, Akikawa, Japan

[73] Assignee: Olympus Optical Co., Ltd., Tokyo, Japan

[21] Appl. No.: 362,781

[22] Filed: Dec. 23, 1994

[30] Foreign Application Priority Data

Dec. 24, 1993 [JP] Japan ................. 5-327940

[51] Int. Cl.⁶ .................................. G02B 15/14
[52] U.S. Cl. ................ 359/692; 359/686; 359/708
[58] Field of Search .................... 359/692, 690, 359/689, 688, 687, 686, 683, 708

[56] References Cited

U.S. PATENT DOCUMENTS

| | | | |
|---|---|---|---|
| 4,906,077 | 3/1990 | Ito | 359/692 |
| 5,309,285 | 5/1994 | Ito | 359/692 |
| 5,315,440 | 5/1994 | Betensky et al. | |

FOREIGN PATENT DOCUMENTS

| | | |
|---|---|---|
| 5113537 | 5/1993 | Japan . |
| 5188292 | 7/1993 | Japan . |
| 5188293 | 7/1993 | Japan . |

*Primary Examiner*—Georgia Y. Epps
*Assistant Examiner*—Dawn-Marie Bey
*Attorney, Agent, or Firm*—Cushman, Darby & Cushman IP Group of Pillsbury Madison & Sutro LLP

[57] ABSTRACT

The invention provides a two-unit zoom lens system comprising a front unit $G_F$ of positive refracting power and a rear unit $G_R$ of negative positive power which achieves a zoom ratio as high as about 3 with the use of a reduced number of lenses, and in which the spacing between both units is varied for zooming, said front unit including on the side proximate to the object a first lens component $G_{F1}$ comprising a lens of plastic material having weak power, said first lens component including at least one aspheric surface, said rear unit including at least one positive lens and at least one negative lens, and said zoom lens system conforming to $0.2 > |f_W/f_{F1}|$ and $1.65 < N_{RN}$ where $f_W$ is the focal length of the overall system at the wide-angle end, $f_{F1}$ is the focal length of said first lens component, and $N_{RN}$ is the refractive index of the negative lens of said rear unit.

21 Claims, 11 Drawing Sheets

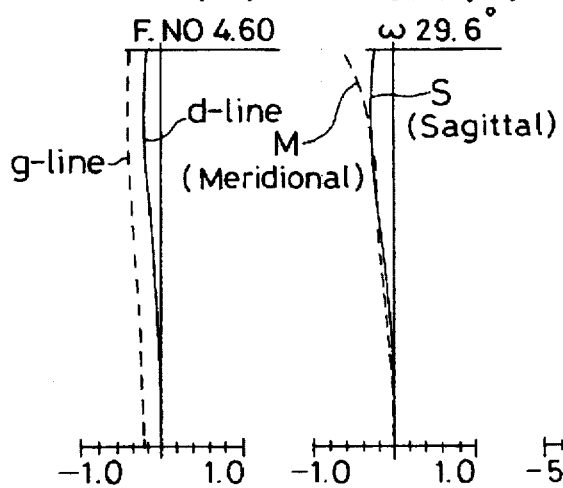
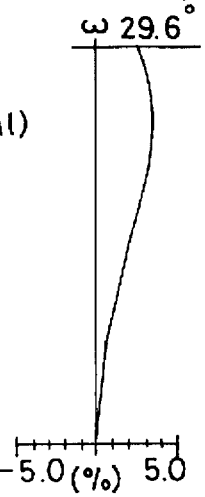
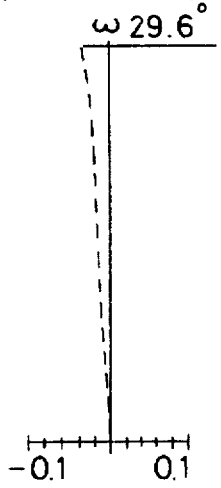
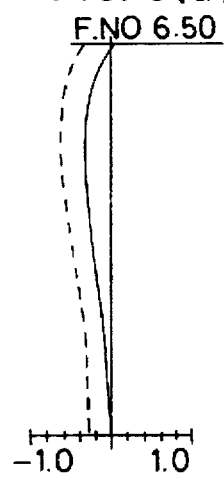
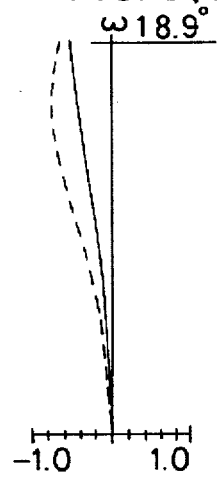
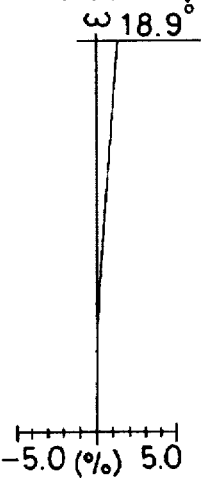
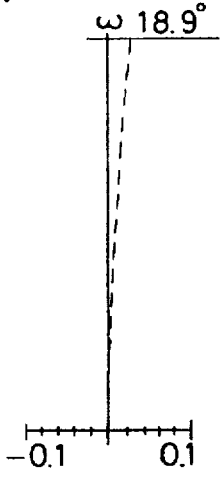
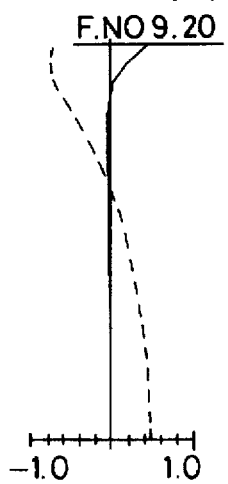
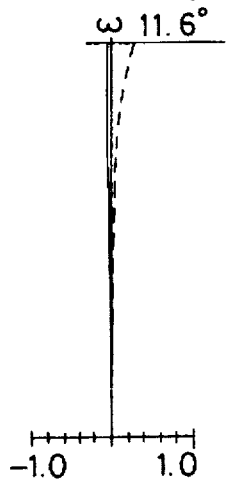
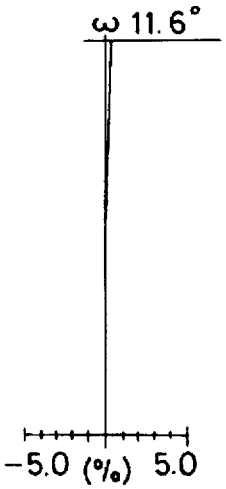
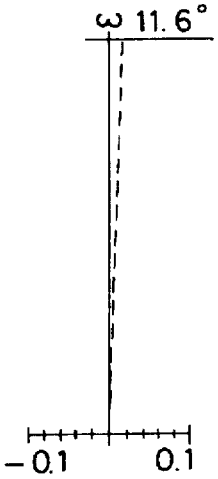

F.NO 4.60

ω 29.6°

ω 29.6°

ω 29.6°

F.NO 6.50

ω 18.9°

ω 18.9°

ω 18.9°

F.NO 9.20

ω 11.6°

ω 11.6°

ω 11.6°

FIG. 11(a) F.NO 4.60
FIG. 11(b) ω 29.6°
FIG. 11(c) ω 29.6°
FIG. 11(d) ω 29.6°
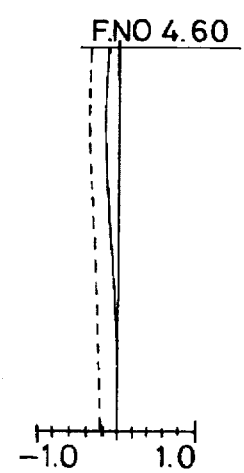
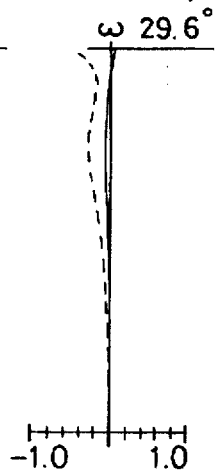
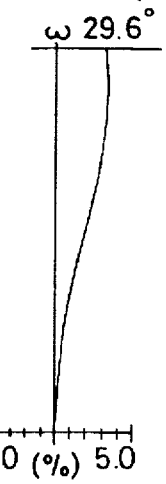
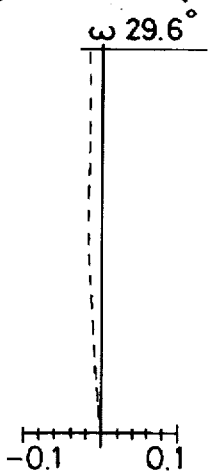
FIG. 12(a) F.NO 6.50
FIG. 12(b) ω 18.9°
FIG. 12(c) ω 18.9°
FIG. 12(d) ω 18.9°
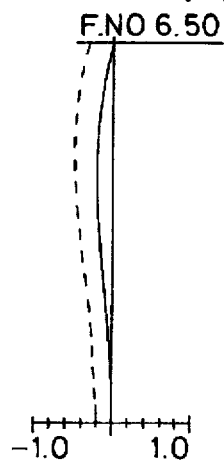
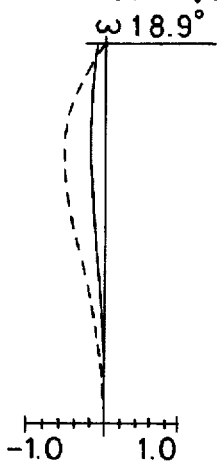
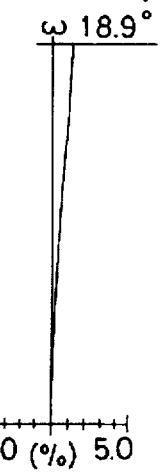
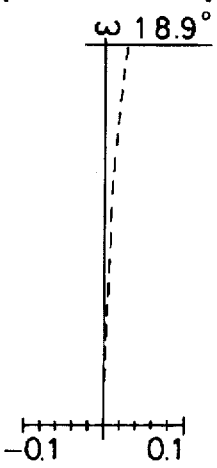
FIG. 13(a) F.NO 9.20
FIG. 13(b) ω 11.6°
FIG. 13(c) ω 11.6°
FIG. 13(d) ω 11.6°
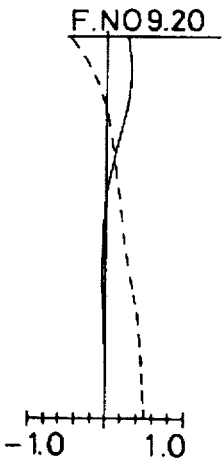
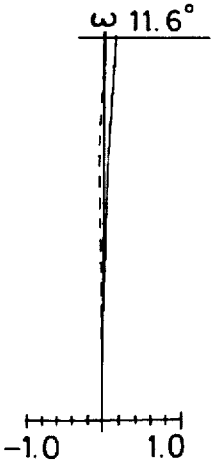
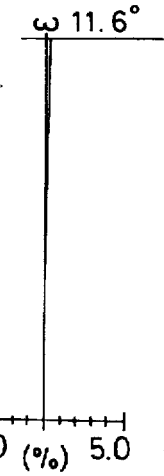
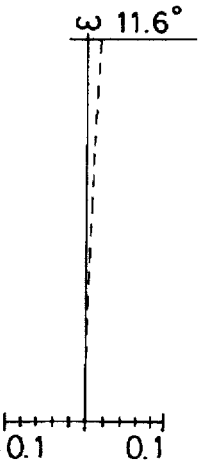

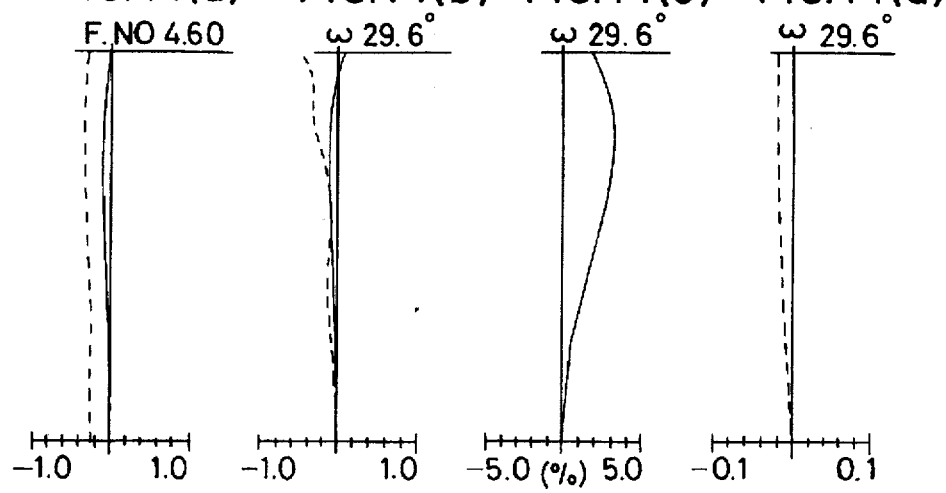
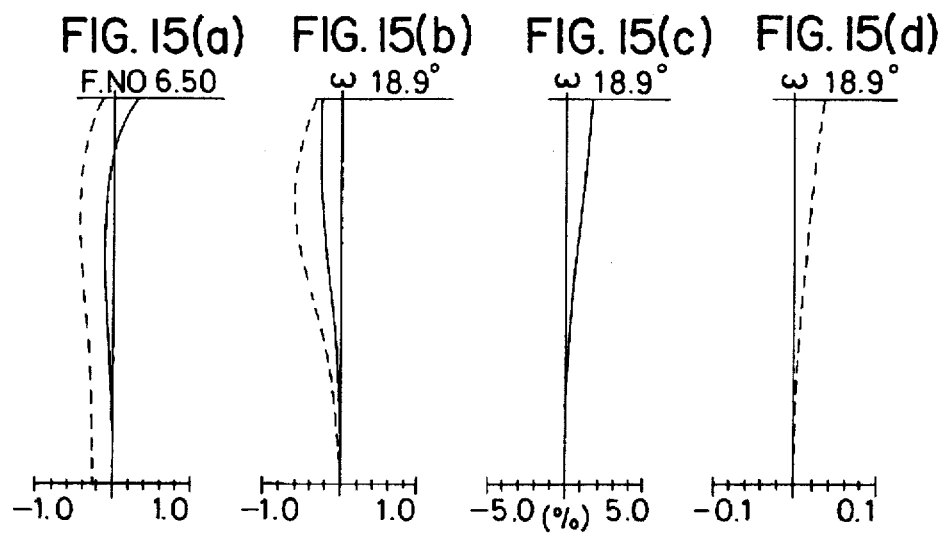
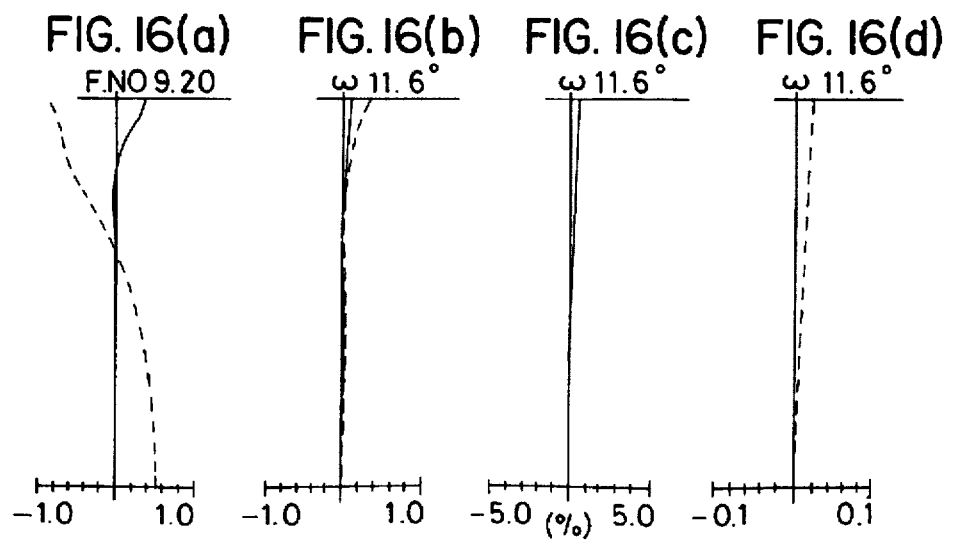

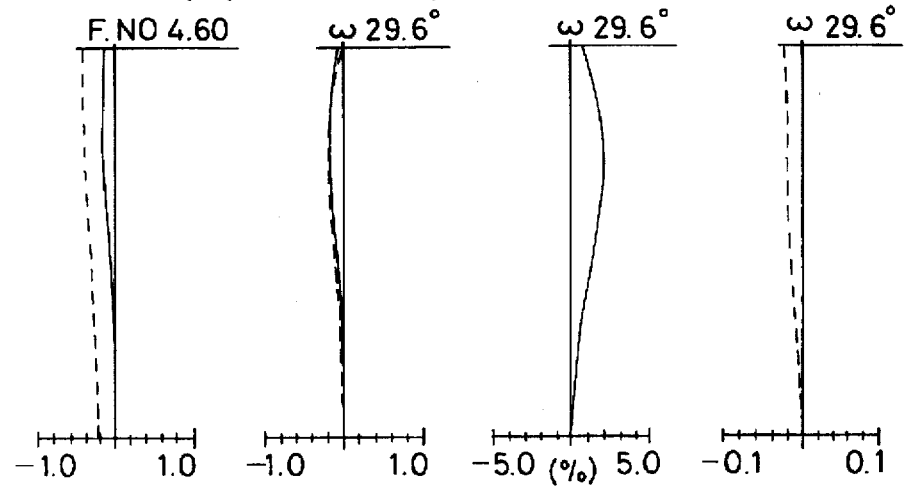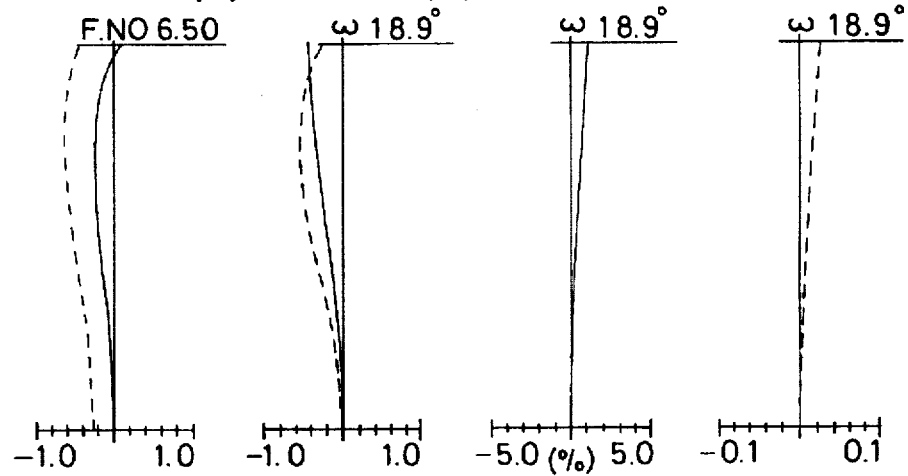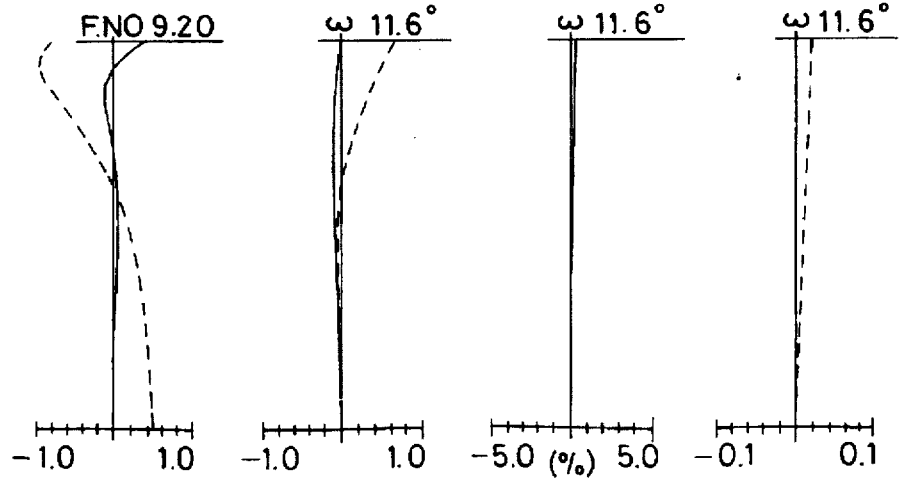

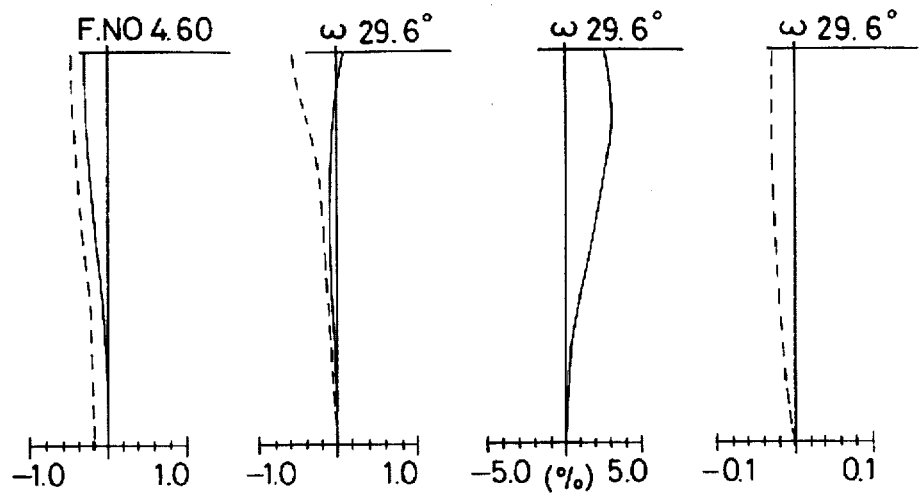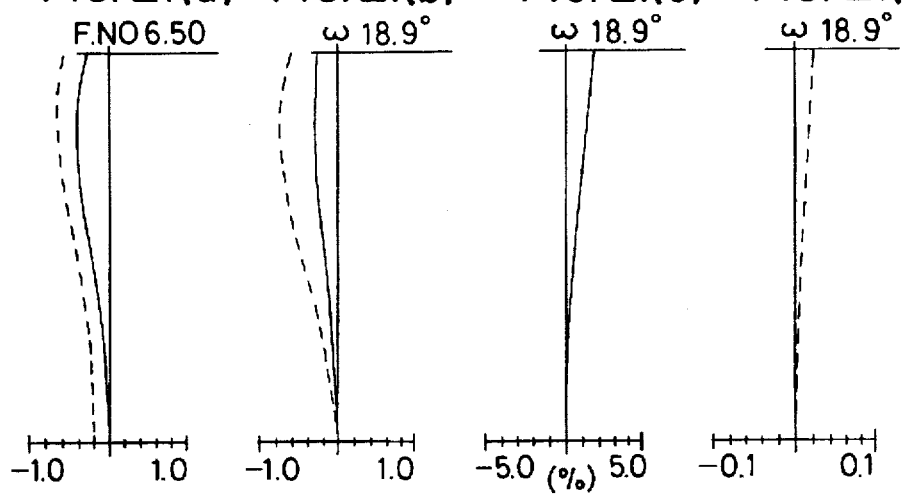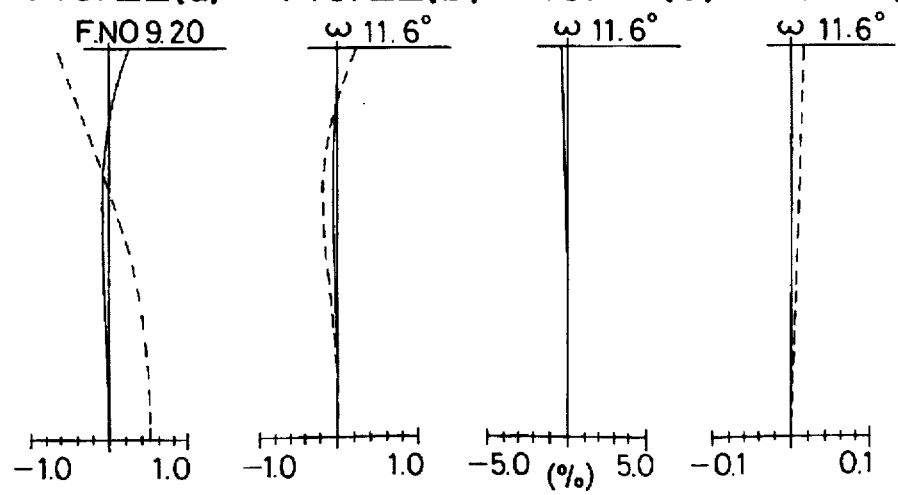

TWO-UNIT ZOOM LENS SYSTEM HAVING A HIGH ZOOM RATIO

BACKGROUND OF THE INVENTION

The present invention relates to a zoom lens system having a high zoom ratio which is made up of a reduced number of lenses, and is best suited for use on lens shutter cameras having an unlimited back focal distance.

So far, many proposals have been made for a two-unit zoom type comprising a front unit of positive refracting power and a rear unit of negative refracting power. This type, because of being made up of a minimum number of units in view of zoom lens design, has a great merit of being simplified in terms of barrel structure and driving mechanism.

Among such a two-unit type of zoom systems there is known a lens system comprising a reduced number of lenses, as typically disclosed in JP-A 3-127008. As an example, this publication refers to a system made up of a front unit comprising a negative lens and a positive lens and a rear unit comprising a positive lens and a negative lens; four lenses in all. Correction for aberrations is then achieved by use of many aspheric surfaces. However, this lens system costs much, because an aspheric lens made of glass material is needed for the negative lens of the first unit for the purpose of making correction for chromatic aberration in the front unit. Another example is directed to a lens system made up of a reduced number of, i.e., 3, lenses in order to achieve cost reduction. However, this lens system has an increased F-number and is not well corrected for aberrations; it is of low commercial value.

To overcome the problems mentioned above, some systems are proposed in JP-A 5-113537, JP-A 5-188292 and JP-A 5-224122. For cost reduction, the first lenses are all constructed from plastic material, and designed to have small refracting power for the purpose of reducing adverse influences due to changes inherent in plastics, which depend on temperature and humidity. For correction for chromatic aberration, the second lenses are each formed of a cemented lens element. In other words, the total number of lenses is about 5.

A system analogous to those disclosed in the three publications referred to above has also been proposed, as disclosed in JP-A 5-188293. However, this system has a first lens of small refracting power yet made of glass; that is, it fails to achieve any cost reduction.

In addition, all the prior systems mentioned above have a zoom ratio as low as about 2 or about 2.4.

SUMMARY OF THE INVENTION

In view of the above-mentioned problems associated with the prior art, an object of the present invention is to provide a two-unit zoom lens system made up of a front unit of positive refracting power and a rear unit of negative refracting power, which is constructed from a reduced number of lenses yet has a high zoom ratio as high as about 3.

According to one aspect of the present invention, the object mentioned just above is achieved by the provision of a two-unit zoom lens system consisting essentially of a front unit $G_F$ having positive refracting power and a rear unit $G_R$ having negative refracting power wherein the spacing between both units is varied for zooming, characterized in that:

said front unit includes on the side proximate to the object a first lens component $G_{F1}$ formed of a plastic medium and having at least one aspheric surface, and said rear unit includes at least one positive lens and at least one negative lens, said first lens component being a lens having weak refracting power within the range conforming to the following conditional formula (1) and the negative lens of said rear unit conforming to the following conditional formula (2):

$$0.2 > |f_W/f_{F1}| \quad (1)$$

$$1.65 < N_{RN} \quad (2)$$

where $f_W$ is the focal length of the overall system at the wide-angle end, $f_{F1}$ is the focal length of said first lens component, and $N_{RN}$ is the refractive index of the negative lens of said rear unit.

Preferably, the rear unit consists of, in order from the object side, a positive meniscus lens convex on the image side and a negative meniscus lens convex on the image side.

Preferably, the front unit includes a second lens component $G_{F2}$ having generally positive power on the image side of the first lens component.

Preferably, the second lens component includes a doublet consisting of a negative lens and a positive lens in order from the object side. In this case, the doublet may be constructed from either a cemented lens or two lenses with an air separation located between them.

Preferably, the second lens component conforms to the following conditional formula (3):

$$1.55 < N_{FP} \quad (3)$$

where $N_{FP}$ is the refractive index of the positive lens of glass located on the side of the second lens component proximate to the image.

Preferably, the rear unit conforms to the following conditional formula (4):

$$15 < v_R \quad (4)$$

where $v_R$ is an Abbe's number difference between the positive and negative lenses of the rear unit.

Preferably, the aspheric surface incorporated in at least one surface of the first lens component is of such shape that it decreases gradually in positive power as it goes farther off the optical axis.

More preferably, the following conditional formula (5) is satisfied in place of the conditional formula (1) referred to above.

$$0.1 > |f_W/f_{F1}| \quad (5)$$

It is preferable that the rear unit includes at least one aspheric surface which increases gradually in positive power as it goes farther off the optical axis.

Preferably, the front unit conforms to the following conditional formula (6):

$$0.5 < f_F/f_W < 1.0 \quad (6)$$

where $f_F$ is the focal length of the front unit.

According to another aspect of the present invention, there is provided a two-unit zoom lens system having a high zoom ratio, which consists essentially of, in order from the object side, a front unit $G_F$ having positive refracting power and a rear unit $G_R$ having negative refracting power, wherein the spacing between both units is varied for zooming, characterized in that:

said front unit $G_F$ comprises a first lens component $G_{F1}$ and a second lens component $G_{F2}$, said first lens component $G_{F1}$ consisting essentially of two lenses, the object-side surface of the lens of said two lenses that is located on the image side being convex on the object side, and said second lens component $G_{F2}$ comprising a doublet lens of negative and positive lens elements and having generally positive refracting power.

Preferably, the first lens component includes at least one plastic lens.

Preferably, the two lenses forming the first lens component are each constructed from a lens of weak refracting power.

Preferably, the first lens component conforms to the following condition:

$$0.2 > |f_W/f_{F1}| \quad (1)$$

where $f_W$ is the focal length of the overall system at the wide-angle end, and $f_{F1}$ is the focal length of the first lens component.

The doublet lens forming the second lens component may consist of, in order from the object side, a negative lens and a positive lens.

This doublet may be a cemented lens.

In the two-unit zoom lens system according to the second aspect of the invention, it is also desired that the front and rear units be moved together for zooming.

A detailed explanation will now be given of why the lens arrangement mentioned above is used and how it works.

In the case of a two-unit zoom type made up of a reduced number of lenses such as one contemplated in the present invention, use of an aspheric surface is important for adequate correction for aberrations. It is especially inevitable to use an aspheric surface for the lens of the front unit $G_F$ located proximately to the object side. For cost reduction, on the other hand, it is desired to do without any expensive aspheric lens of glass, if possible. With this in mind, the first lens component $G_{F1}$ of the front unit $G_F$ located proximately to the object side is made of an aspheric lens of plastic material, whereby a reasonable compromise is effected between correction for aberrations and cost reduction. As well-known in the art, however, plastic material is likely to change in the index of refraction and shape depending on temperature and humidity changes, causing some focus shift to occur. To avoid this, the power of the plastic lens is so reduced that it has little, if any, influence on the optical system even when there is an environmental change. The condition to this end is given by the following formula (1). As can be understood from Example 4 to be given later, it is here noted that the first lens component $G_{F1}$ may be made up of two or more plastic aspheric lenses of weak power.

$$0.2 > |f_W/f_{F1}| \quad (1)$$

Here $f_W$ is the focal length of the overall system at the wide-angle end and $f_{F1}$ is the focal length of the first lens component $G_{F1}$.

If the upper limit of 0.2 defined by condition (1) is exceeded, the focal length of the first lens component $G_{F1}$ then becomes short. This is not preferable because of an unacceptably large focus shift.

For the lens arrangement of the rear unit $G_R$ at least one positive lens and at least one negative lens are needed. This enables curvature of field and chromatic aberration to be corrected. However, as the number of lenses decreases with a zoom ratio increase, as in the present invention, the Petzval's sum becomes positively large, resulting in over-correction for curvature of field. This tendency can by no means be made up for. To make proper correction for this curvature of field, it is required that the refractive index of the negative lens of the rear unit $G_R$ be allowed to have a relatively high value. The condition to this end is given by the following conditional formula (2). In general, a vitreous material having a high refractive index costs much; it is efficient to use such a vitreous material for a lens having as large an effect on correction as possible. In particular, the negative lens of the rear unit $G_R$ has large refracting power; so it is greatly effective for correction for curvature of field. The refractive index $N_{RN}$ of the negative lens of said rear unit $G_R$ satisfies the following condition:

$$1.65 < N_{RN} \quad (2)$$

Exceeding the lower limit of 1.65 given by Cond. (2) is not preferable because curvature of field is overcorrected.

It is desired that the second lens component $G_{F2}$ having strong positive refracting power be located in the rear of the first lens component $G_{F1}$ located proximately to the object side of the rear unit $G_R$. Preferably, the second lens component $G_{F2}$ has a negative lens and a positive lens in order from the object side. This second lens component makes it more difficult to produce high-order aberrations, renders it easier to correct for the aberrations of the overall system, and achieve better correction for chromatic aberration, when compared with a lens component with the lens order reversed to that mentioned just above, because the surfaces of both the lenses opposite to each other are not considerably reduced in the radius of curvature. Too small a radius of curvature is not preferable, because not only are aberrations adversely affected, but also lens workability becomes worse, incurring some considerable expense.

In view of correction for aberrations, cemented lens design is much superior to lens design with an air separation. To avoid high-order aberrations, it is thus preferable to use said negative and positive lenses in the form of a cemented lens.

It is also desired that the following conditional formula (3) be satisfied, as follows:

$$1.55 < N_{FP} \quad (3)$$

Here $N_{FP}$ is the refractive index of the positive glass lens of the second lens component $G_{F2}$ located proximately to the image side. For instance, when the final lens is a plastic lens as in Example 3 to be described later, this condition is applied to a glass lens located farther off the final lens.

Condition (3) is given for correction for spherical aberration, especially, that at the wide-angle end. When the refractive index of the positive glass lens does not reach the lower limit of 1.55 defined by condition (3), the radius of curvature of the surface of the positive glass lens located on the image side becomes too small to reduce the amount of the spherical aberration produced. At this time, the spherical aberration at the telephoto end is corrected by combination with the aspheric surface, but the spherical aberration at the wide-angle end remains intact.

The rear unit $G_R$ includes at least one positive lens and at least one negative lens, and conforms preferably to the following conditional formula (4):

$$15 < v_R \quad (4)$$

Here $v_R$ is a difference in Abbe's number between the positive and negative lenses of the rear unit $G_R$.

To make sufficient correction for chromatic aberration, it is desired that the rear unit $G_R$ conform to conditional formula (4). To construct the present zoom lens system from a minimum number of lenses, it is also desired that the rear unit $G_R$ comprises, in order from the object side, a positive meniscus lens convex on the image side and a negative meniscus lens convex on the image side.

Preferably, at least one aspheric surface of the first lens unit $G_{F1}$ is of such shape that it decreases gradually in positive power (or increases gradually in negative power) as it goes farther off the optical axis.

The first lens component $G_{F1}$ must conform to conditional formula (1). To minimize the influences of temperature and humidity, however, it is preferred that the first lens component $G_{F1}$ conforms to the following conditional formula (5):

$$0.1 > |f_W/f_{F1}|. \tag{5}$$

When the rear unit $G_R$ includes an aspheric surface, that aspheric surface is preferably of such shape that it increases gradually in positive power (or decreases gradually in negative power) as it goes farther off the optical axis.

To make the optical system compact, it is desired that the conditional formula (6) be satisfied, as follows:

$$0.5 < f_F/f_W < 1.0. \tag{6}$$

Here $f_F$ is the focal length of the front unit $G_F$.

Exceeding the upper limit of 1.0 defined by condition (6) is not preferable, because the amount of movement of the units associated with zooming increases, so making it impossible to achieve compactness. It is again not preferable that the lower limit of 0.5 is not reached, because difficulty is involved in making good-enough correction for aberrations.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 5 is an aberration diagram of spherical aberration (a), astigmatism (b), distortion (c) and chromatic aberration of magnification (d) of Example 1 at the wide-angle end.

FIGS. 6(a–d) are aberration diagrams, similar to FIG. 5, of Example 1 at standard settings.

FIGS. 7(a–d) are aberration diagrams, similar to FIG. 5, of Example 1 at the telephoto end.

FIGS. 11(a–d) are aberration diagrams, similar to FIG. 5, of Example 3 at the wide-angle end.

FIGS. 12(a–d) are aberration diagrams, similar to FIG. 5, of Example 3 at standard settings.

FIGS. 13(a–d) are aberration diagrams, similar to FIG. 5, of Example 3 at the telephoto end.

FIGS. 14(a–d) are aberration diagrams, similar to FIG. 5, of Example 4 at the wide-angle end.

FIGS. 15(a–d) are aberration diagrams, similar to FIG. 5, of Example 4 at standard settings.

FIGS. 16(a–d) are aberration diagrams, similar to FIG. 5, of Example 4 at the telephoto end.

FIGS. 17(a–d) are aberration diagrams, similar to FIG. 5, of Example 5 at the wide-angle end.

FIGS. 18(a–d) are aberration diagrams, similar to FIG. 5, of Example 5 at standard settings.

FIGS. 19(a–d) are aberration diagrams, similar to FIG. 5, of Example 5 at the telephoto end.

FIGS. 20(a–d) are aberration diagrams, similar to FIG. 5, of Example 6 at the wide-angle end.

FIGS. 21(a–d) are aberration diagrams, similar to FIG. 5, of Example 6 at standard settings.

FIGS. 22(a–d) are aberration diagrams, similar to FIG. 5, of Example 6 at the telephoto end.

DESCRIPTION OF THE PREFERRED EMBODIMENTS

Figure 1A:
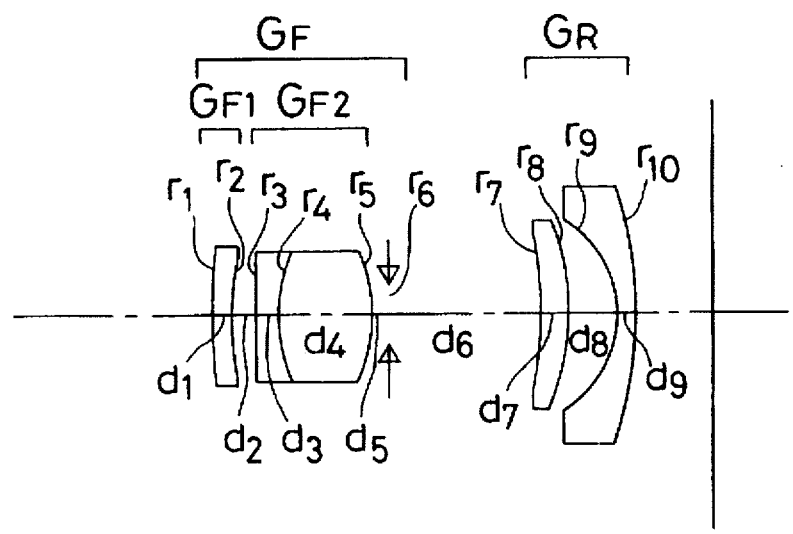
FIG. 1 is a sectional view of the lens arrangement of the two-unit zoom lens system according to Example 1 of the invention at the wide-angle (a) and telephoto (b) ends.
Figure 1B:
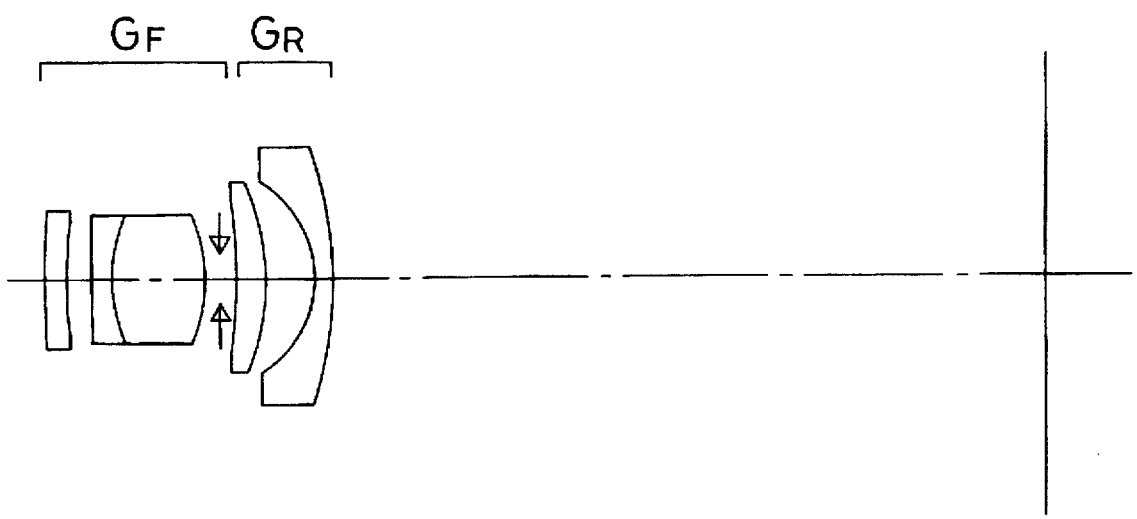
Figure 2A:
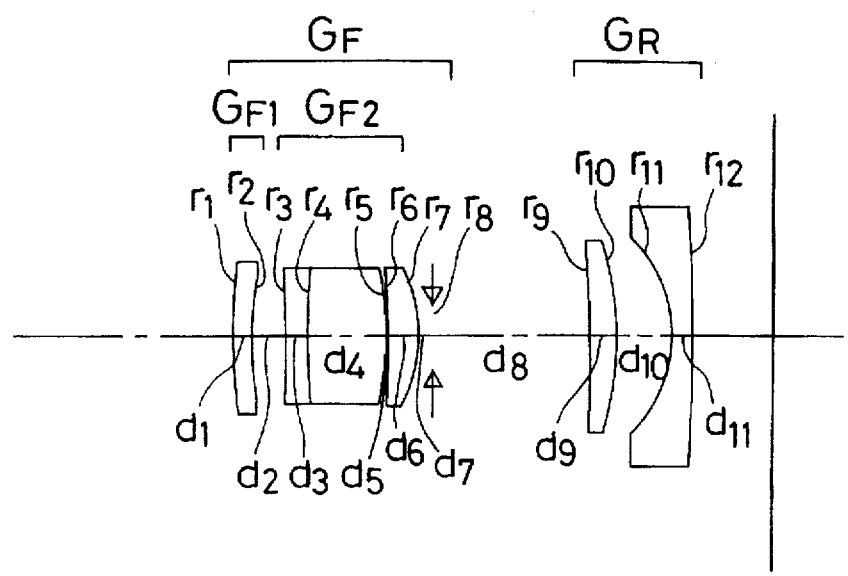
FIG. 2 is a view, similar to FIG. 1, of the two-unit zoom lens system according to Example 2 of the invention.
Figure 2B:
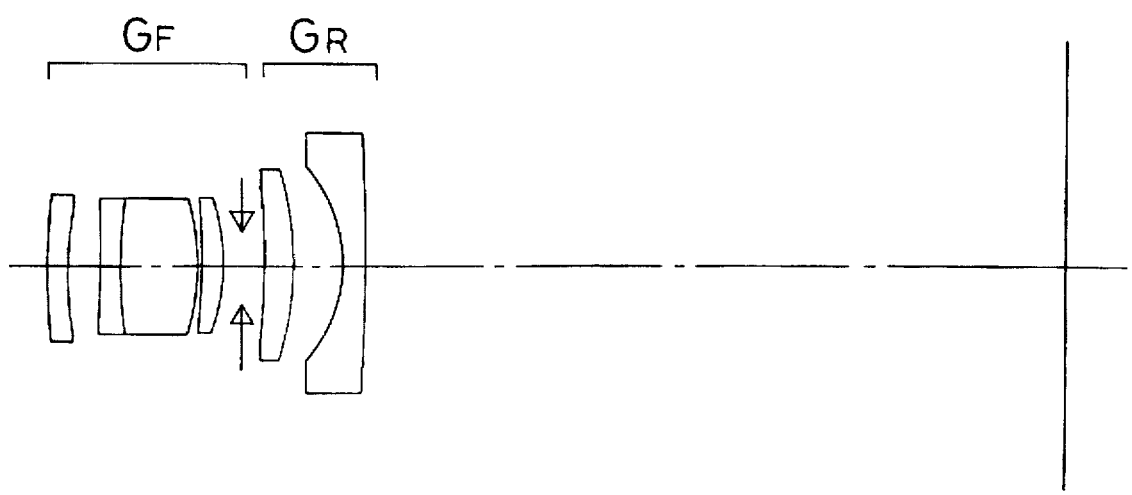
Figure 3A:
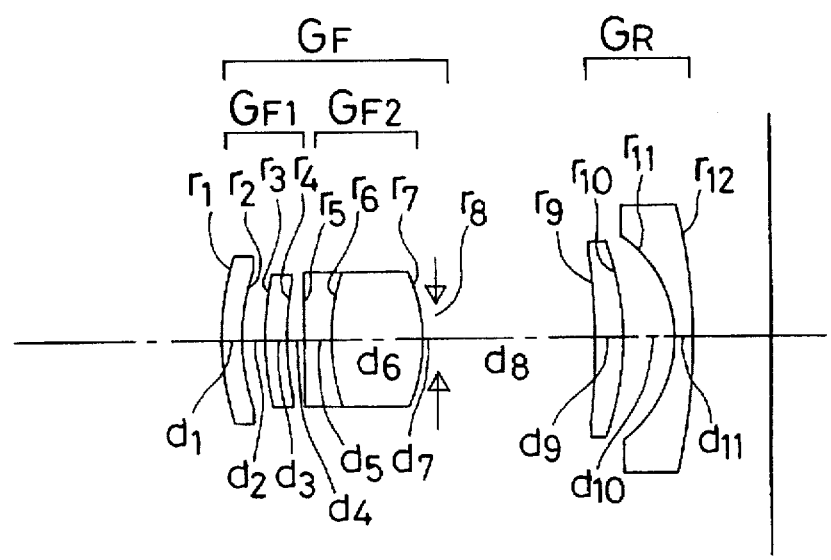
FIG. 3 is a view, similar to FIG. 1, of the two-unit zoom lens system according to Example 4 of the invention.
Figure 3B:
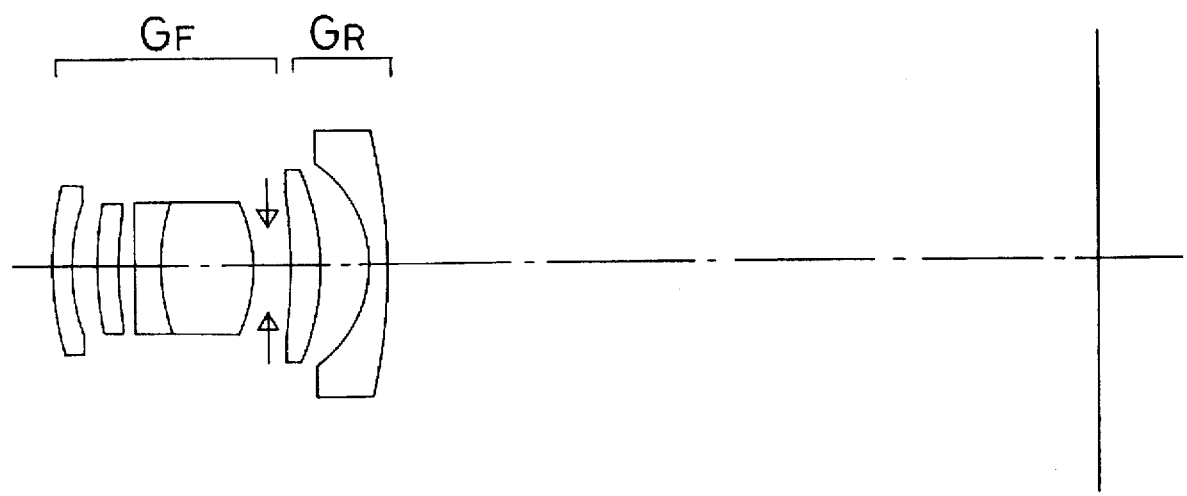
Figure 4A:
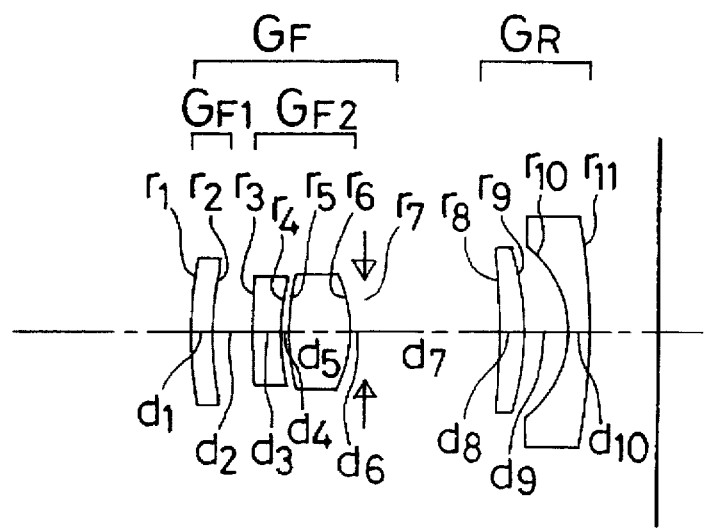
FIG. 4 is a view, similar to FIG. 1, of the two-unit zoom lens system according to Example 6 of the invention.
Figure 4B:
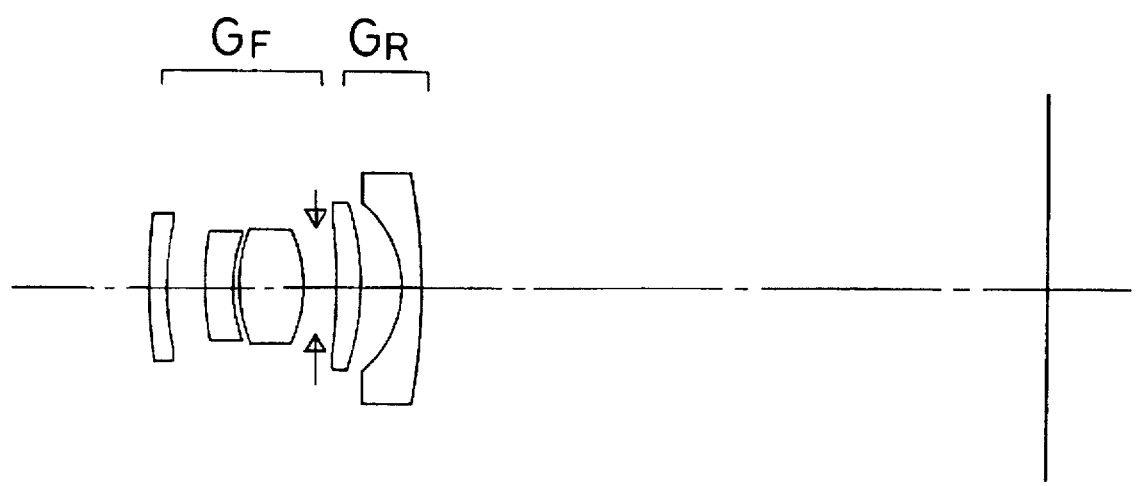
Figure 8A:
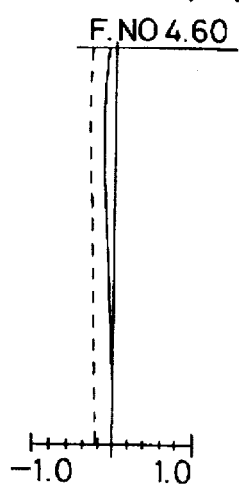
FIGS. 8(a–d) are aberration diagrams, similar to FIG. 5, of Example 2 at the wide-angle end.
Figure 8B:
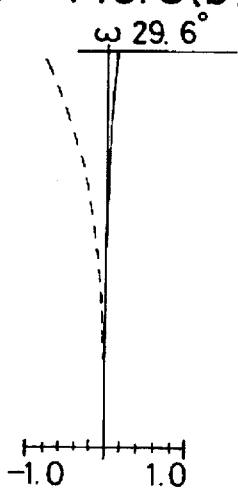
Figure 8C:
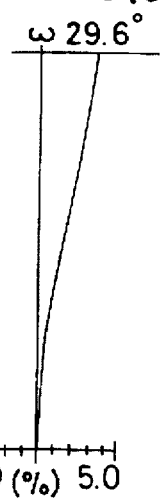
Figure 8D:
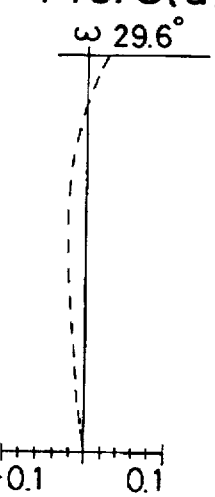
Figure 9A:
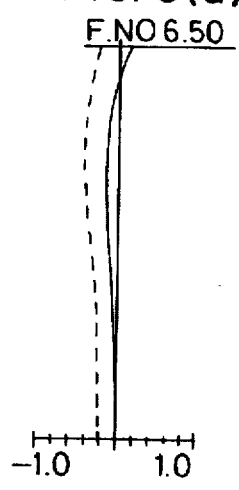
FIGS. 9(a–d) are aberration diagrams, similar to FIG. 5, of Example 2 at standard settings.
Figure 9B:
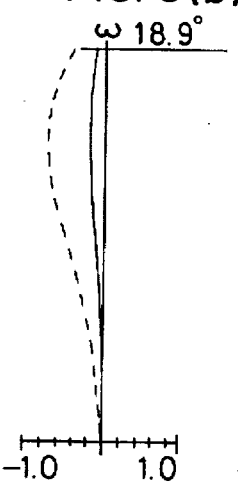
Figure 9C:
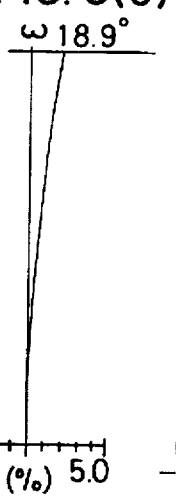
Figure 9D:
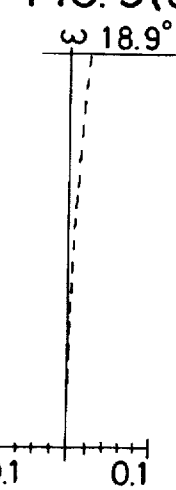
Figure 10A:
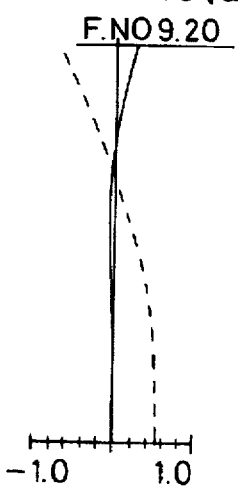
FIGS. 10(a–d) are aberration diagrams, similar to FIG. 5, of Example 2 at the telephoto end.
Figure 10B:
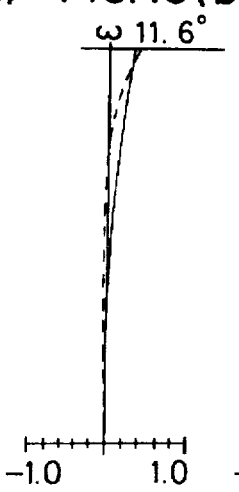
Figure 10C:
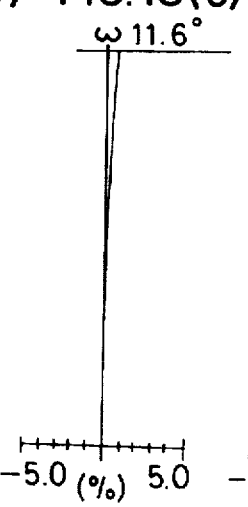
Figure 10D:
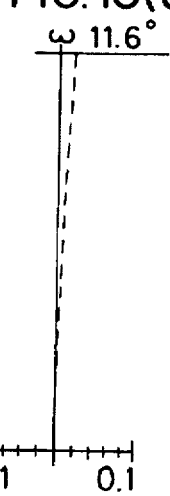

Examples 1–6 of the two-unit zoom lens system according to the invention will be given just below.

FIGS. 1–4 are sectional views of the lens arrangements of Examples 1, 2, 4 and 6 at the wide-angle (a) and telephoto (b) ends. Examples 3 and 5 are substantially similar to Examples 2 and 1, respectively, and so are not illustrated.

The focal lengths exemplified are 38 mm to 105 mm.

The lens arrangement according to Example 1 comprises, in order from the object side, a front unit $G_F$ made up of a first lens component $F_{G1}$ consisting of a plastic lens of weak power and having two aspheric surfaces and a second lens component $F_{G2}$ consisting of a cemented lens of negative and positive lens elements, and a rear unit $G_R$ made up of a plastic lens having two aspheric surfaces and a negative lens.

The lens arrangement according to Example 2 comprises, in order from the object side, a front unit $G_F$ made up of a first lens component $G_{F1}$ consisting of an aspheric plastic lens of weak power and a second lens component $G_{F2}$ consisting of a cemented lens of negative and positive lens elements and a positive lens, and a rear unit $G_R$ made up of a positive lens including an aspheric surface and a negative lens including an aspheric surface.

The lens arrangement according to Example 3 comprises, in order from the object side, a front unit $G_F$ made up of a first lens component $G_{F1}$ consisting of an aspheric plastic lens of weak power and a second lens component $G_{F2}$ consisting of a cemented lens of negative and positive lens elements and a positive plastic lens including an aspheric surface, and a rear unit $G_R$ made up of a positive plastic lens having two aspheric surfaces and a negative lens.

The lens arrangement according to Example 4 comprises, in order from the object side, a front unit $G_F$ made up of a first lens component $G_{F1}$ consisting of two plastic lenses of weak power, each having two aspheric surfaces, and a second lens component $G_{F2}$ consisting of a cemented lens of negative and positive lens elements, and a rear unit $G_R$ made up of a positive lens including an aspheric surface and a negative lens.

The lens arrangement according to Example 5 comprises, in order from the object side, a front unit $G_F$ made up of a first lens component $G_{F1}$ consisting of a plastic lens of weak power and having two aspheric surfaces, and a second lens component $G_{F2}$ consisting of a cemented lens of negative and positive lens elements, and a rear unit $G_R$ made up of a positive lens including an aspheric surface and a negative lens.

The lens arrangement according to Example 6 comprises, in order from the object side, a front unit $G_F$ made up of a first lens component $G_{F1}$ consisting of a plastic lens of weak power and having two aspheric surfaces and a second lens component $G_{F2}$ consisting of a negative lens and a positive lens with an air separation located between them, and a rear unit $G_R$ made up of a positive lens including an aspheric surface and a negative lens.

In each of the examples, between the front and rear units $G_F$ and $G_R$ there is located an aperture stop which is movable together with the front unit $G_F$.

Set out below are the lens data about the respective examples. Symbols used hereinafter but not referred to hereinbefore have the following meanings.

f: the focal length of the overall system $F_{NO}$: F-number $2\omega$: the angle of field $f_B$: back focus $r_1, r_2 \ldots$ : the radii of curvature of the respective lenses $d_1, d_2 \ldots$ : the spacing between the respective lenses $n_{d1}, n_{d2} \ldots$ : the d-line refractive indices of the respective lenses $v_{d1}, v_{d2} \ldots$ : the Abbe's number of the respective lenses Now let x and y denote the direction of propagation of light on the optical axis and the direction perpendicular to the optical axis. Then, aspheric shape is given by $$x = (y^2/r)/[1+\{1-P(y/r)^2\}^{1/2}] + A_4 y^4 + A_6 y^6 + A_8 y^8 + A_{10} y^{10}$$

Here r is the paraxial radius of curvature, P is the conical coefficient, and $A_4$, $A_6$, $A_8$ and $A_{10}$ are the aspheric coefficients.

Example 1 f = 38 ~ 63.2 ~ 105
$F_{NO}$ = 4.6 ~ 6.5 ~ 9.2
$2\Omega$ = 59.2 ~ 37.7 ~ 23.2°
$f_B$ = 7.4 ~ 30.8 ~ 69.6

| | | | |
|---|---|---|---|
| $r_1$ = 46.7950 (Aspheric) | $d_1$ = 2.000 | $n_{d1}$ = 1.49241 | $v_{d1}$ = 57.66 |
| $r_2$ = 42.1310 (Aspheric) | $d_2$ = 2.200 | | |
| $r_3$ = 128.2610 | $d_3$ = 2.500 | $n_{d2}$ = 1.72342 | $v_{d2}$ = 37.95 |
| $r_4$ = 17.0080 | $d_4$ = 8.900 | $n_{d3}$ = 1.58913 | $v_{d3}$ = 61.18 |
| $r_5$ = −15.6230 | $d_5$ = 1.000 | | |
| $r_6$ = ∞ (Stop) | $d_6$ = (Variable) | | |
| $r_7$ = −40.2110 (Aspheric) | $d_7$ = 3.000 | $n_{d4}$ = 1.58423 | $v_{d4}$ = 30.49 |
| $r_8$ = −24.1420 (Aspheric) | $d_8$ = 4.700 | | |
| $r_9$ = −11.1780 | $d_9$ = 1.800 | $n_{d5}$ = 1.74100 | $v_{d5}$ = 52.68 |
| $r_{10}$ = −44.2020 | | | |

Zooming Spaces

| f | 38 | 63.2 | 105 |
|---|---|---|---|
| $d_6$ | 14.9620 | 6.7880 | 1.8810 |

Aspherical Coefficients

1st surface $A_4 = -0.15355 \times 10^{-3}$
$A_6 = 0.28713 \times 10^{-6}$
$A_8 = -0.11664 \times 10^{-7}$
$A_{10} = 0.17026 \times 10^{-9}$ 2nd surface $A_4 = -0.87802 \times 10^{-4}$
$A_6 = 0.10008 \times 10^{-5}$
$A_8 = -0.14221 \times 10^{-7}$
$A_{10} = 0.24843 \times 10^{-9}$ 7th surface $A_4 = 0.49248 \times 10^{-4}$
$A_6 = 0.35246 \times 10^{-6}$
$A_8 = 0.33345 \times 10^{-8}$
$A_{10} = 0$ 8th surface $A_4 = 0.17051 \times 10^{-5}$
$A_6 = 0.50487 \times 10^{-7}$
$A_8 = -0.90931 \times 10^{9}$
$A_{10} = 0$ Example 2 f = 38 ~ 63.2 ~ 105
$F_{NO}$ = 4.6 ~ 6.5 ~ 9.2
$2\omega$ = 59.2 ~ 37.7 ~ 23.2°
$f_B$ = 7.8 ~ 30.0 ~ 66.8

| | | | |
|---|---|---|---|
| $r_1$ = 46.5900 (Aspheric) | $d_1$ = 2.000 | $n_{d1}$ = 1.49241 | $v_{d1}$ = 57.66 |
| $r_2$ = 42.8550 | $d_2$ = 3.000 | | |
| $r_3$ = −132.9680 | $d_3$ = 2.100 | $n_{d2}$ = 1.80518 | $v_{d2}$ = 25.43 |
| $r_4$ = 72.4360 | $d_4$ = 7.700 | $n_{d3}$ = 1.51633 | $v_{d3}$ = 64.15 |
| $r_5$ = −23.2180 | $d_5$ = 0.200 | | |
| $r_6$ = −54.0770 | $d_6$ = 2.400 | $n_{d4}$ = 1.60311 | $v_{d4}$ = 60.70 |
| $r_7$ = −19.2790 | $d_7$ = 1.000 | | |
| $r_8$ = ∞ (Stop) | $d_8$ = (Variable) | | |
| $r_9$ = −92.1720 (Aspheric) | $d_9$ = 3.000 | $n_{d5}$ = 1.59270 | $v_{d5}$ = 35.29 |
| $r_{10}$ = −30.0100 | $d_{10}$ = 5.100 | | |
| $r_{11}$ = −12.9600 (Aspheric) | $d_{11}$ = 1.800 | $n_{d6}$ = 1.74100 | $v_{d6}$ = 52.68 |
| $r_{12}$ = −386.1190 | | | |

Zooming Spaces

| f | 38 | 63.2 | 105 |
|---|---|---|---|
| $d_8$ | 15.3270 | 7.2670 | 2.4290 |

Aspherical Coefficients

1st surface $A_4 = -0.75532 \times 10^{-4}$
$A_6 = -0.28491 \times 10^{-6}$
$A_8 = -0.43461 \times 10^{-8}$
$A_{10} = 0.38288 \times 10^{-10}$ 9th surface $A_4 = 0.25091 \times 10^{-4}$
$A_6 = 0.19124 \times 10^{-6}$
$A_8 = -0.36975 \times 10^{-10}$
$A_{10} = -0.35144 \times 10^{-11}$ 11th surface $A_4 = 0.14770 \times 10^{-4}$
$A_6 = -0.74548 \times 10^{-7}$
$A_8 = 0.10298 \times 10^{-8}$
$A_{10} = 0$

Example 3 f = 38 ~ 63.2 ~ 105
$F_{NO}$ = 4.6 ~ 6.5 ~ 9.2
$2\omega$ = 59.2 ~ 37.7 ~ 23.2°
$f_B$ = 8.4 ~ 31.0 ~ 68.3

| | | | |
|---|---|---|---|
| $r_1$ = 47.0000 (Aspheric) | $d_1$ = 2.000 | $n_{d1}$ = 1.49241 | $v_{d1}$ = 57.66 |
| $r_2$ = 47.0000 | $d_2$ = 1.900 | | |
| $r_3$ = −70.1560 | $d_3$ = 3.700 | $n_{d2}$ = 1.83400 | $v_{d2}$ = 37.16 |
| $r_4$ = 30.2720 | $d_4$ = 6.500 | $n_{d3}$ = 1.56873 | $v_{d3}$ = 63.16 |
| $r_5$ = −13.8070 | $d_5$ = 0.500 | | |
| $r_6$ = 58.8680 | $d_6$ = 2.000 | $n_{d4}$ = 1.49241 | $v_{d4}$ = 57.66 |
| $r_7$ = −246.2110 (Aspheric) | $d_7$ = 1.000 | | |
| $r_8$ = ∞(Stop) | $d_8$ = (Variable) | | |
| $r_9$ = −101.4810 (Aspheric) | $d_9$ = 3.000 | $n_{d5}$ = 1.58423 | $v_{d5}$ = 30.49 |
| $r_{10}$ = −37.5810 (Aspheric) | $d_{10}$ = 4.500 | | |
| $r_{11}$ = −11.1680 | $d_{11}$ = 1.800 | $n_{d6}$ = 1.72916 | $v_{d6}$ = 54.68 |
| $r_{12}$ = −56.7100 | | | |

Zooming Spaces

| f | 38 | 63.2 | 105 |
|---|---|---|---|
| $d_8$ | 14.3690 | 7.0290 | 2.6230 |

Aspherical Coefficients

1st surface $A_4$ = −0.11667 × 10⁻³
$A_6$ = −0.52323 × 10⁻⁶
$A_8$ = −0.10053 × 10⁻⁷
$A_{10}$ = 0.85837 × 10⁻¹⁰

7th surface $A_4$ = −0.21508 × 10⁻⁴
$A_6$ = 0.10243 × 10⁻⁶
$A_8$ = −0.71735 × 10⁻⁸
$A_{10}$ = 0.46595 × 10⁻¹⁰

9th surface $A_4$ = 0.75364 × 10⁻⁴
$A_6$ = 0.13007 × 10⁻⁵
$A_8$ = −0.12154 × 10⁻⁷
$A_{10}$ = 0.10334 × 10⁹

10th surface $A_4$ = 0.21055 × 10⁻⁴
$A_6$ = 0.13327 × 10⁻⁵
$A_8$ = −0.17772 × 10⁻⁷
$A_{10}$ = 0.15466 × 10⁻⁹

Example 4 f = 38 ~ 63.2 ~ 105
$F_{NO}$ = 4.6 ~ 6.5 ~ 9.2
$2\omega$ = 59.2 ~ 37.7 ~ 23.2°
$f_B$ = 7.3 ~ 30.1 ~ 67.9

| | | | |
|---|---|---|---|
| $r_1$ = 35.0000 (Aspheric) | $d_1$ = 2.000 | $n_{d1}$ = 1.49241 | $v_{d1}$ = 57.66 |
| $r_2$ = 35.0000 (Aspheric) | $d_2$ = 2.300 | | |
| $r_3$ = 35.0000 (Aspheric) | $d_3$ = 2.000 | $n_{d2}$ = 1.49241 | $v_{d2}$ = 57.66 |
| $r_4$ = 35.0000 (Aspheric) | $d_4$ = 1.500 | | |
| $r_5$ = 567.4500 | $d_5$ = 2.500 | $n_{d3}$ = 1.83400 | $v_{d3}$ = 37.16 |
| $r_6$ = 19.7680 | $d_6$ = 9.200 | $n_{d4}$ = 1.62041 | $v_{d4}$ = 60.27 |
| $r_7$ = −14.5660 | $d_7$ = 1.000 | | |
| $r_8$ = ∞(Stop) | $d_8$ = (Variable) | | |
| $r_9$ = −46.1640 (Aspheric) | $d_9$ = 3.000 | $n_{d5}$ = 1.67270 | $v_{d5}$ = 32.10 |
| $r_{10}$ = −27.3700 | $d_{10}$ = 4.900 | | |
| $r_{11}$ = −11.2840 | $d_{11}$ = 1.800 | $n_{d6}$ = 1.74100 | $v_{d6}$ = 52.68 |
| $r_{12}$ = −50.1020 | | | |

Zooming Spaces

| f | 38 | 63.2 | 105 |
|---|---|---|---|
| $d_8$ | 15.0800 | 7.0810 | 2.2790 |

Aspherical Coefficients

1st surface $A_4$ = 0.11066 × 10⁻³
$A_6$ = −0.14425 × 10⁻⁶
$A_8$ = 0.18504 × 10⁻⁸
$A_{10}$ = −0.19215 × 10⁻⁹

2nd surface $A_4$ = 0.22289 × 10⁻³
$A_6$ = −0.21013 × 10⁻⁶
$A_8$ = 0.30607 × 10⁻⁷
$A_{10}$ = −0.11483 × 10⁻⁸

3rd surface $A_4$ = 0.17319 × 10⁻⁴
$A_6$ = 0.84165 × 10⁻⁶
$A_8$ = −0.32329 × 10⁻⁷
$A_{10}$ = −0.90030 × 10⁻⁹

4th surface $A_4$ = 0.11314 × 10⁻⁴
$A_6$ = 0.19783 × 10⁻⁵
$A_8$ = −0.75349 × 10⁻⁷
$A_{10}$ = 0.19872 × 10⁻⁹

9th surface $A_4$ = 0.44904 × 10⁻⁴
$A_6$ = 0.24274 × 10⁻⁶
$A_8$ = 0.13836 × 10⁻⁸
$A_{10}$ = −0.44066 × 10⁻¹⁴

Example 5 f = 38 ~ 63.2 ~ 105
$F_{NO}$ = 4.6 ~ 6.5 ~ 9.2
$2\omega$ = 59.2 ~ 37.7 ~ 23.2°
$f_B$ = 7.5 ~ 31.3 ~ 70.7

| | | | |
|---|---|---|---|
| $r_1$ = 46.6760 (Aspheric) | $d_1$ = 2.000 | $n_{d1}$ = 1.49241 | $v_{d1}$ = 57.66 |
| $r_2$ = 48.3060 (Aspheric) | $d_2$ = 1.900 | | |
| $r_3$ = ∞ | $d_3$ = 2.800 | $n_{d2}$ = 1.83400 | $v_{d2}$ = 37.16 |
| $r_4$ = 21.6980 | $d_4$ = 9.100 | $n_{d3}$ = 1.62041 | $v_{d3}$ = 60.27 |
| $r_5$ = −14.8610 | $d_5$ = 1.000 | | |
| $r_6$ = ∞ (Stop) | $d_6$ = (Variable) | | |
| $r_7$ = −47.7910 (Aspheric) | $d_7$ = 3.000 | $n_{d4}$ = 1.69895 | $v_{d4}$ = 30.12 |
| $r_8$ = −28.0220 | $d_8$ = 4.900 | | |
| $r_9$ = −12.3690 | $d_9$ = 1.800 | $n_{d5}$ = 1.77250 | $v_{d5}$ = 49.66 |
| $r_{10}$ = −57.9300 | | | |

Zooming Spaces

| f | 38 | 63.2 | 105 |
|---|---|---|---|
| $d_6$ | 16.0820 | 7.5490 | 2.4270 |

Aspherical Coefficients

1st surface $A_4$ = −0.10556 × 10⁻³
$A_6$ = −0.32060 × 10⁻⁶
$A_8$ = −0.49931 × 10⁻⁸
$A_{10}$ = 0.63447 × 10⁻¹⁰

2nd surface $A_4$ = −0.16884 × 10⁻⁴
$A_6$ = 0.45572 × 10⁻⁶
$A_8$ = −0.10141 × 10⁻⁷
$A_{10}$ = 0.19150 × 10⁻⁹

7th surface $A_4$ = 0.31609 × 10⁻⁴
$A_6$ = 0.24835 × 10⁻⁶
$A_8$ = 0.26386 × 10⁻⁹
$A_{10}$ = −0.14242 × 10⁻¹¹

Example 5

```
f = 38 ~ 63.2 ~ 105
F_NO = 4.6 ~ 6.5 ~ 9.2
2ω = 59.2 ~ 37.7 ~ 23.2°
f_B = 7.5 ~ 30.0 ~ 67.3
```

| | | | |
|---|---|---|---|
| $r_1 = 44.9040$ (Aspheric) | $d_1 = 2.000$ | $n_{d1} = 1.49241$ | $v_{d1} = 57.66$ |
| $r_2 = 40.5470$ (Aspheric) | $d_2 = 4.300$ | | |
| $r_3 = 71.7580$ | $d_3 = 3.000$ | $n_{d2} = 1.75520$ | $v_{d2} = 27.51$ |
| $r_4 = 21.7180$ | $d_4 = 0.800$ | | |
| $r_5 = 25.8520$ | $d_5 = 6.700$ | $n_{d3} = 1.57250$ | $v_{d3} = 57.76$ |
| $r_6 = -15.6320$ | $d_6 = 1.000$ | | |
| $r_7 = \infty$ (Stop) | $d_7 =$ (Variable) | | |
| $r_8 = -64.5070$ (Aspheric) | $d_8 = 3.000$ | $n_{d4} = 1.58423$ | $v_{d4} = 30.49$ |
| $r_9 = -29.8380$ | $d_9 = 4.800$ | | |
| $r_{10} = -11.8200$ | $d_{10} = 1.800$ | $n_{d5} = 1.72916$ | $v_{d5} = 54.68$ |
| $r_{11} = -72.4670$ | | | |

Zooming Spaces

| f | 38 | 63.2 | 105 |
|---|---|---|---|
| $d_6$ | 14.7820 | 6.8280 | 2.0530 |

Aspherical Coefficients

1st surface $A_4 = -0.69477 \times 10^{-4}$
$A_6 = -0.19474 \times 10^{-6}$
$A_8 = 0.39148 \times 10^{-8}$
$A_{10} = -0.28706 \times 10^{-10}$ 2nd surface $A_4 = -0.15885 \times 10^{-5}$
$A_6 = 0.25558 \times 10^{-6}$
$A_8 = 0.69971 \times 10^{-8}$
$A_{10} = -0.35645 \times 10^{-10}$ 8th surface $A_4 = 0.41178 \times 10^{-4}$
$A_6 = 0.22792 \times 10^{-6}$
$A_8 = 0.16078 \times 10^{-8}$
$A_{10} = -0.10063 \times 10^{-10}$ Aberration diagrams of Example 1 at the wide-angle end, standard settings and telephoto end are shown in FIGS. 5–7, similar aberration diagrams of Example 2 in FIGS. 8–10, similar aberration diagrams of Example 3 in FIGS. 11–13, similar aberration diagrams of Example 4 in FIGS. 14–16, similar aberration diagrams of Example 5 in FIGS. 17–19, and similar aberration diagrams of Example 6 in FIGS. 20–22. In these diagrams (a), (b), (c) and (d) indicate spherical aberration, astigmatism, distortion and chromatic aberration of magnification, respectively.

Tabulated below are the values of Examples 1–6 corresponding to the conditional formulae (1)–(4) and (6) mentioned above.

| | Ex. 1 | Ex. 2 | Ex. 3 | Ex. 4 | Ex. 5 | Ex. 6 |
|---|---|---|---|---|---|---|
| (1) | −0.038 | −0.019 | 0.006 | 0.020 | 0.019 | −0.038 |
| (2) | 1.741 | 1.741 | 1.729 | 1.741 | 1.773 | 1.729 |
| (3) | 1.589 | 1.603 | 1.569 | 1.620 | 1.620 | 1.573 |
| (4) | 22.19 | 17.39 | 24.19 | 20.58 | 19.54 | 24.19 |
| (6) | 0.763 | 0.778 | 0.736 | 0.764 | 0.773 | 0.767 |

Figure 23:
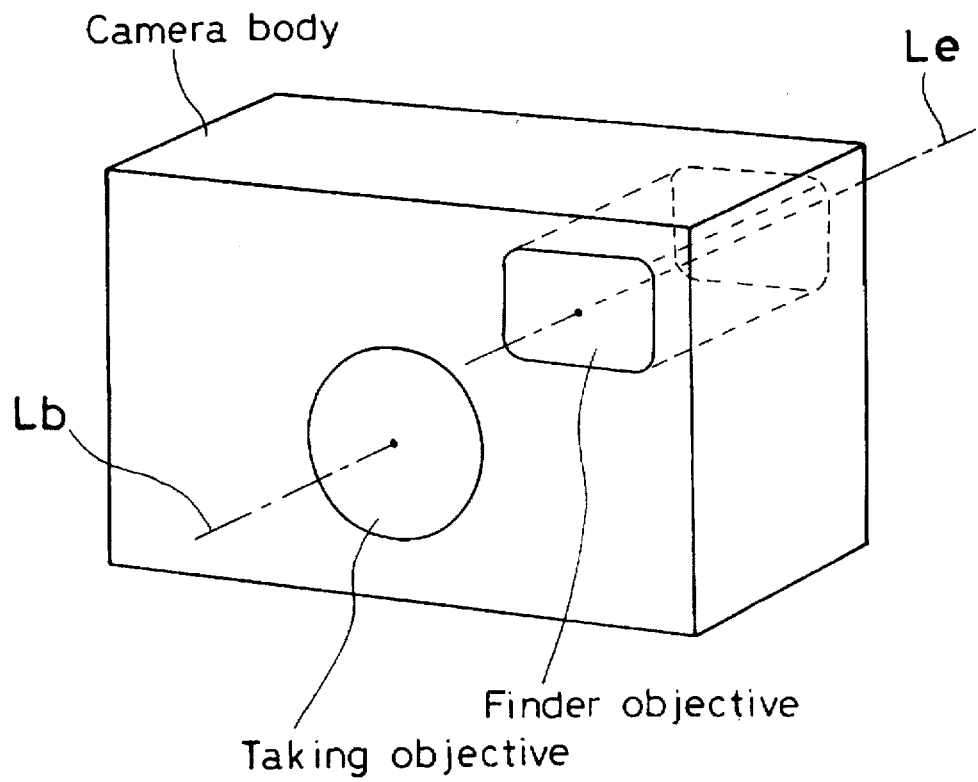
FIG. 23 is a perspective view of the construction of a compact camera on which the two-unit zoom lens system of the invention is used.
Figure 24:
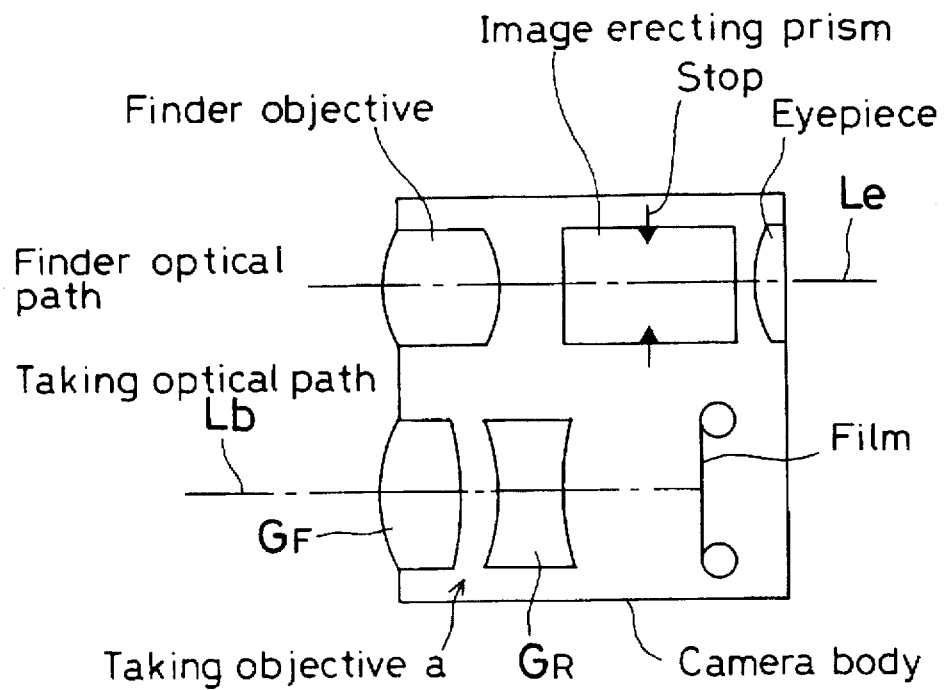
FIG. 24 is a sectional view of the construction of a compact camera on which the two-unit zoom lens system of the invention is used.

The present zoom lens mentioned above, for instance, is used on a taking objective a of a compact camera with the construction perspectively and sectionally shown in FIGS. 23 and 24, wherein Lb and Le represent a taking optical path and an optical path for finder which are parallel with each other. The image of a subject is viewed through a finder built up of a finder objective, an image erecting prism, an aperture stop and an eyepiece, and formed through the taking objective lens a onto film.

With the inventive construction mentioned above, it is possible to achieve a high-performance zoom lens system of the positive/negative two-unit type which is made up of a reduced number of lenses, which is compact, and has a zoom ratio as high as about 3.

What I claim is:

1. A two-unit zoom lens system having a high zoom ratio comprising, in order from an object to an image side:

a front lens unit $G_F$ having positive refractive power; and a rear lens unit $G_R$ having negative refractive power, said rear lens unit being disposed laterally along an optic axis on said image side relative to said front lens unit $G_F$, reserving a space therebetween, wherein said space is varied for zooming said lens systems, said front lens unit is comprised of a first lens component $G_{F1}$ disposed on said object side of said front lens unit, wherein said first lens component is comprised of, in order from said object side to said image side, a first plastic lens element, wherein said first plastic lens element has at least one aspherical surface and a weak negative refracting power such that a focal length of the overall system at the wide-angle end, $f_W$, and a focal length of said first lens component, $f_{F1}$, substantially conform to the condition $$0.2 > |f_W/f_{F1}|$$

said rear lens unit is comprised of a positive lens and a negative lens, wherein a refractive index of said negative lens, $N_{NR}$, conforms to the condition $$1.65 < N_{RN}$$

wherein said front unit includes on the image side of said first lens component a second lens component $G_{F2}$ having generally positive power, and wherein said second lens component includes a doublet of negative and positive lenses in order form the object side.

2. A two-unit zoom lens system having a high zoom ratio comprising, in order from an object to an image side:

a front lens unit $G_F$ having positive refractive power; and a rear lens unit $G_R$ having negative refractive power, said rear lens unit being disposed laterally along an optic axis on said image side relative to said front lens unit $G_F$ such that a space is reserved therebetween, wherein said space is varied for zooming said lens systems, said front lens unit being comprised of a first lens component $G_{F1}$ formed of a plastic material, wherein said lens component $G_{F1}$ is disposed on said object side of said front lens unit, is comprised of a lens of weak refracting power such that the focal length of the overall system at a wide-angle end, $f_W$, and a focal length of said first lens component, $f_{F1}$, substantially conform to the condition $$0.2 > |f_W/f_{F1}|,$$

and has at least one aspherical surface, said rear lens unit being comprised of a positive lens and a negative lens, wherein the refractive index of said negative lens $N_{RN}$ conforms to the condition $$1.65 < N_{RN},$$

and wherein said first lens unit $G_F$ further comprises a second lens component $G_{F2}$ having generally positive power which is disposed on the image side of said first lens component, and is comprised of a doublet, in order from said object to said image side, of a negative lens and a positive lens.

3. A two-unit zoom lens system having a high zoom ratio as claimed in claim 1 or 2, characterized in that said second lens component is glass and conforms to the following conditional formula (3):

$$1.55 < N_{FP} \qquad (3)$$

where $N_{FP}$ is the refractive index of said positive lens.

4. A two-unit zoom lens system according to claim 2, characterized in that said doublet is a cemented lens.

5. A two-unit zoom lens system having a high zoom ratio comprising, in order from an object to an image side:

front lens unit $G_F$ having positive refractive power; and a rear lens unit $G_R$ having negative refractive power, said rear lens unit being disposed laterally along an optic axis on said image side relative to said front lens unit $G_F$ such that a space is reserved therebetween, wherein said space is varied for zooming said lens systems, said front lens unit being comprised of a first lens component $G_{F1}$ formed of a plastic material, wherein said lens component $G_{F1}$ is disposed on said object side of said front lens unit, is comprised of a lens of weak refracting power such that the focal length of the overall system at a wide-angle end, $f_W$, and a focal length of said first lens component, $f_{F1}$, substantially conform to the condition $$0.2 > |f_W/f_{F1}|,$$

and has at least one aspherical surface;

said rear lens unit being comprised of a positive lens and a negative lens, wherein the refractive index of said negative lens $N_{RN}$ conforms to the condition $$1.65 < N_{RN},$$

and wherein said rear lens unit conforms to the following formula:

$$15 < \nu_R$$

where $\nu_R$ is an Abbe's number difference between the positive and negative lenses of the rear lens unit.

6. A two-unit zoom lens system having a high zoom ratio comprising, in order from an object to an image side:

a front lens unit $G_F$ having positive refractive power; and a rear lens unit $G_R$ having negative refractive power, said rear lens unit being disposed laterally along an optic axis on said image side relative to said front lens unit $G_F$ such that a space is reserved therebetween, wherein said space is varied for zooming said lens systems, said front lens unit being comprised of a first lens component $G_{F1}$ formed of a plastic material, wherein said lens component $G_{F1}$ is disposed on said object side of said front lens unit, is comprised of a lens of weak refracting power such that the focal length of the overall system at a wide-angle end, $f_W$, and a focal length of said first lens component, $f_{F1}$, substantially conform to the condition $$0.2 > |f_W/f_{F1}|,$$

and has at least one aspherical surface;

said rear lens unit being comprised of a positive lens and a negative lens, wherein the refractive index of said negative lens $N_{RN}$ conforms to the condition $$1.65 < N_{RN},$$

and wherein said aspherical surface is of such shape that it decreases gradually in positive power as it goes farther off said optical axis.

7. A two-unit zoom lens system having a high zoom ratio comprising, in order from an object to an image side:

a front lens unit $G_F$ having positive refractive power; and a rear lens unit $G_R$ having negative refractive power, said rear lens unit being disposed laterally along an optic axis on said image side relative to said front lens unit $G_F$ such that a space is reserved therebetween, wherein said space is varied for zooming said lens systems, said front lens unit being comprised of a first lens component $G_{F1}$ formed of a plastic material, wherein said lens component $G_{F1}$ is disposed on said object side of said front lens unit, is comprised of a lens of weak refracting power such that the focal length of the overall system at a wide-angle end, $f_W$, and a focal length of said first lens component, $f_{F1}$, substantially conform to the condition $$0.1 > |f_W/f_{F1}|,$$

and has at least one aspherical surface;

said rear lens unit being comprised of a positive lens and a negative lens, wherein the refractive index of said negative lens $N_{RN}$ conforms to the condition $$1.65 < N_{RN}.$$

8. A two-unit zoom lens system according to claim 7, characterized in that said rear unit conforms to the following conditional formula (4):

$$15 < \nu_R \qquad (4)$$

where $\nu_R$ is an Abbe's number difference between the positive and negative lenses of the rear unit.

9. A two-unit zoom lens system according to claim 7, characterized in that the aspheric surface incorporated in at least one surface of said first lens component is of such shape that it decreases gradually in positive power as it goes farther off the optical axis.

10. A two-unit zoom lens system according to claim 7, characterized in that the following conditional formula is satisfied:

$$0.1 > |f_W/f_{F1}| \qquad (5)$$

11. A two-unit zoom lens system according to claim 7, characterized in that said rear unit includes at least one aspheric surface, said aspheric surface being of such shape that it increases gradually in positive power as it goes farther off the optical axis.

12. A two-unit zoom lens system having a high zoom ratio comprising, in order from an object to an image side:

a front lens unit $G_F$ having positive refractive power; and a rear lens unit $G_R$ having negative refractive power, said rear lens unit being disposed laterally along an optic axis on said image side relative to said front lens unit $G_F$ such that a space is reserved therebetween, wherein said space is varied for zooming said lens systems, said front lens unit being comprised of a first lens component $G_{F1}$ formed of a plastic material, wherein said lens component $G_{F1}$ is disposed on said object side of said front lens unit, is comprised of a lens of weak refracting power such that the focal length of the overall system at a wide-angle end, $f_W$, and a focal length of said first lens component, $f_{F1}$, substantially conform to the condition $$0.2 > |f_W/f_{F1}|,$$

and has at least one aspherical surface;

said rear lens unit being comprised of a positive lens and a negative lens, wherein the refractive index of said negative lens $N_{RN}$ conforms to the condition $$1.65 < N_{RN},$$

and wherein said rear lens unit includes at least a second aspherical surface, said second aspherical surface being of such shape that it increases gradually in positive power as it goes farther off the optical axis.

13. A two-unit zoom lens system having a high zoom ratio comprising, in order from an object to an image side:

a front lens unit $G_F$ having positive refractive power; and a rear lens unit $G_R$ having negative refractive power, said rear lens unit being disposed laterally along an optic axis on said image side relative to said front lens unit $G_F$ such that a space is reserved therebetween, wherein said space is varied for zooming said lens systems, said front unit $G_F$ comprises a first lens component $G_{F1}$ and a second lens component $G_{F2}$, said first lens component $G_{F1}$ being comprised of, in order from said object to said image side, a first lens and a second lens, wherein said second lens has a convex surface on said object side, said second lens component $G_{F2}$ being comprised of a doublet lens of negative and positive lens elements and has a positive refractive power, and wherein said first lens component conforms to the following condition:

$$0.2 > |f_W/f_{F1}|$$

where $f_W$ is the focal length of the of the overall system at the wide-angle end, and $f_{F1}$ is the focal length of the first lens component.

14. A two-unit zoom lens system having a high zoom ratio comprising, in order from an object to an image side:

a front lens unit $G_F$ having positive refractive power; and a rear lens unit $G_R$ having negative refractive power, said rear lens unit being disposed laterally along an optic axis on said image side relative to said front lens unit $G_F$ such that a space is reserved therebetween, wherein said space is varied for zooming said lens systems, said front unit $G_F$ being comprised of a first lens component $G_{F1}$ and a second lens component $G_{F2}$, said first lens component $G_{F1}$ being comprised of, in order from said object to said image side, a first lens and a second lens, wherein said second lens has a convex surface on said object side, said second lens component $G_{F2}$ being comprised of a doublet lens of, in order from the object side, negative and positive lens elements and having a positive refractive power.

15. A two-unit zoom lens system according to claim 13 or 14, characterized in that the doublet forming said second lens component is a cemented lens.

16. A two-unit zoom lens system according to claims 13 or 14, characterized in that said first lens component includes at least one plastic lens.

17. A two-unit zoom lens system having a high zoom ratio comprising, in order from an object to an image side:

a front lens unit $G_F$ having positive refractive power; and a rear lens unit $G_R$ having negative refractive power, said rear lens unit being disposed laterally along an optic axis on said image side relative to said front lens unit $G_F$ such that a space is reserved therebetween, wherein said space is varied for zooming said lens systems, said front lens unit being comprised of a first lens component $G_{F1}$ formed of a plastic material, wherein said lens component $G_{F1}$ is disposed on said object side of said front lens unit, is comprised of a lens of weak refracting power such that the focal length of the overall system at a wide-angle end, $f_W$, and a focal length of said first lens component, $f_{F1}$, substantially conform to the condition $$0.2 > |f_W/f_{F1}|,$$

and has at least one aspherical surface;

said rear lens unit being comprised of a positive lens and a negative lens, wherein the refractive index of said negative lens $N_{RN}$ conforms to the condition $$1.65 < N_{RN},$$

and said front lens unit being comprised of a second lens component $G_{F2}$ of positive refractive power disposed on the image side of said first lens component, wherein said second lens component is comprised of, in order from said object to said image side, a negative lens and a positive lens with an airspace reserved therebetween, wherein said negative lens has a convex surface on said image side and said positive lens has a convex surface on said object side.

18. A two-unit zoom lens system having a high zoom ratio comprising, in order from an object to an image side:

a front lens unit $G_F$ having positive refractive power; and a rear lens unit $G_R$ having negative refractive power, said rear lens unit being disposed laterally along an optic axis on said image side relative to said front lens unit $G_F$, reserving a space therebetween, wherein said space is varied for zooming said lens systems, said front lens unit is comprised of a first lens component $G_{F1}$ disposed on said object side of said front lens unit, wherein said first lens component is comprised of, in order from said object side to said image side, a first plastic lens element, wherein said first plastic lens element has at least one aspherical surface and a weak negative refracting power such that a focal length of the overall system at the wide-angle end, $f_W$, and a focal length of said first lens component, $f_{F1}$, substantially conform to the condition $0.2 > |f_W/f_{F1}|$ said rear lens unit is comprised of a positive lens and a negative lens, wherein a refractive index of said negative lens, $N_{NR}$, conforms to the condition $1.65 < N_{RN}$, and wherein said rear unit conforms to the following conditional formula:

$15 < \nu_R$ where $\nu_R$ is an Abbe's number difference between the positive and negative lenses of the rear unit.

19. A two-unit zoom lens system having a high zoom ratio comprising, in order from an object to an image side:

a front lens unit $G_F$ having positive refractive power; and a rear lens unit $G_R$ having negative refractive power, said rear lens unit being disposed laterally along an optic axis on said image side relative to said front lens unit $G_F$, reserving a space therebetween, wherein said space is varied for zooming said lens systems, said front lens unit is comprised of a first lens component $G_{F1}$ disposed on said object side of said front lens unit, wherein said first lens component is comprised of, in order from said object side to said image side, a first plastic lens element, wherein said first plastic lens element has at least one aspherical surface and a weak negative refracting power such that a focal length of the overall system at the wide-angle end, $f_W$, and a focal length of said first lens component, $f_{F1}$, substantially conform to the condition $0.2 > |f_W/f_{F1}|$ said rear lens unit is comprised of a positive lens and a negative lens, wherein a refractive index of said negative lens, $N_{NR}$, conforms to the condition $1.65 < N_{RN}$, and wherein the aspheric surface incorporated in at least one surface of said first lens component is of such shape that it decreases gradually in positive power as it goes farther off the optical axis.

20. A two-unit zoom lens system having a high zoom ratio comprising, in order from an object to an image side:

a front lens unit $G_F$ having positive refractive power; and a rear lens unit $G_R$ having negative refractive power, said rear lens unit being disposed laterally along an optic axis on said image side relative to said front lens unit $G_F$, reserving a space therebetween, wherein said space is varied for zooming said lens systems, said front lens unit is comprised of a first lens component $G_{F1}$ disposed on said object side of said front lens unit, wherein said first lens component is comprised of, in order from said object side to said image side, a first plastic lens element, wherein said first plastic lens element has at least one aspherical surface and a weak negative refracting power such that a focal length of the overall system at the wide-angle end, $f_W$, and a focal length of said first lens component, $f_{F1}$, substantially conform to the condition $0.2 > |f_W/f_{F1}|$ said rear lens unit is comprised of a positive lens and a negative lens, wherein a refractive index of said negative lens, $N_{NR}$, conforms to the condition $1.65 < N_{RN}$, and wherein, the following conditional formula is satisfied:

$0.1 > |f_W/f_{F1}|$.

21. A two-unit zoom lens system having a high zoom ratio comprising, in order from an object to an image side:

a front lens unit $G_F$ having positive refractive power; and a rear lens unit $G_R$ having negative refractive power, said rear lens unit being disposed laterally along an optic axis on said image side relative to said front lens unit $G_F$, reserving a space therebetween, wherein said space is varied for zooming said lens systems, said front lens unit is comprised of a first lens component $G_{F1}$ disposed on said object side of said front lens unit, wherein said first lens component is comprised of, in order from said object side to said image side, a first plastic lens element, wherein said first plastic lens element has at least one aspherical surface and a weak negative refracting power such that a focal length of the overall system at the wide-angle end, $f_W$, and a focal length of said first lens component, $f_{F1}$, substantially conform to the condition $0.2 > |f_W/f_{F1}|$ said rear lens unit is comprised of a positive lens and a negative lens, wherein a refractive index of said negative lens, $N_{NR}$, conforms to the condition $1.65 < N_{RN}$, and wherein said rear unit includes at least one aspheric surface, said aspheric surface being of such shape that it increases gradually in positive power as it goes farther off the optical axis.

* * * * *